US008686659B2

(12) United States Patent
Kumar et al.

(10) Patent No.: US 8,686,659 B2
(45) Date of Patent: Apr. 1, 2014

(54) MULTIPLE LAMP LIGHTING LEVEL BALLAST FOR SERIES CONNECTED LAMPS

(75) Inventors: Nitin Kumar, Burlington, MA (US); Shashank Bakre, Woburn, MA (US); Thomas J. Schalton, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 328 days.

(21) Appl. No.: 13/169,613

(22) Filed: Jun. 27, 2011

(65) Prior Publication Data
US 2012/0326609 A1 Dec. 27, 2012

(51) Int. Cl.
*H05B 37/02* (2006.01)
(52) U.S. Cl.
USPC .......... 315/210; 315/201; 315/224; 315/247; 315/291; 315/307
(58) Field of Classification Search
USPC ............. 315/88, 90, 201, 205, 224, 210, 247, 315/291, 294, 307
See application file for complete search history.

(56) References Cited

U.S. PATENT DOCUMENTS

| 4,896,079 A | | 1/1990 | Tabor | |
|---|---|---|---|---|
| 5,610,448 A | * | 3/1997 | Dattilo | 307/39 |
| 5,661,645 A | * | 8/1997 | Hochstein | 363/89 |
| 5,831,395 A | * | 11/1998 | Mortimer et al. | 315/307 |
| 5,949,196 A | * | 9/1999 | Lesea et al. | 315/240 |
| 2006/0197463 A1 | | 9/2006 | Peng | |

FOREIGN PATENT DOCUMENTS

WO 96/03850 A1 2/1996
WO 2008/092501 A1 8/2008

OTHER PUBLICATIONS

Joao Carlos Silva, International Search Report and Written Opinion of the International Searching Authority, Oct. 23, 2012, pp. 1-8, European Patent Office, Rijswijk, The Netherlands.

* cited by examiner

*Primary Examiner* — Douglas W Owens
*Assistant Examiner* — Thai Pham
(74) *Attorney, Agent, or Firm* — Shaun P. Montana

(57) ABSTRACT

A ballast that selectively operates multiple lamps is provided. The ballast includes a switching network, capable of operating in a number of switching configurations. The ballast also includes a control circuit, and two lamp control switches. The control circuit is connected to the switching network, and provides respective control signals via respective output terminals as a function of the switching configuration of the switching network. Each lamp control switch is in parallel with its lamp and is connected to a respective output terminal. The first lamp control switch is connected to a ballast power supply, and either provides power to the first lamp or does not, depending on the first control signal. The second lamp control switch is connected to the first lamp control switch and to ground, and either provides power to the second lamp or does not, depending on the second control signal.

20 Claims, 2 Drawing Sheets

MULTIPLE LAMP LIGHTING LEVEL BALLAST FOR SERIES CONNECTED LAMPS

TECHNICAL FIELD

The present invention relates to lighting, and more specifically, to electronic ballasts for lamps.

BACKGROUND

Lighting systems that operate at multiple lighting levels are typically used in various lighting applications, such as in overhead lighting. Such lighting systems conserve energy, because they allow the level of light output by the system to be less than the maximum possible light level, when maximum light is not necessary. In addition to providing energy savings, multiple level lighting systems enhance productivity in commercial environments by providing those in the workplace with the ability to customize the lighting level in their individual work spaces.

SUMMARY

Conventional lighting systems that operate at multiple lighting levels can be costly and require many additional components. For example, a typical implementation of a two level lighting system includes two power switches and two ballasts. Each power switch in the lighting system controls only one of the ballasts. Turning on both of the switches at the same time powers both ballasts, thus producing the maximum possible (or full) light output. Turning on only one of the switches applies power to only one of the ballasts in the lighting system, and thus results in a reduced light output (level) and a corresponding reduction in power consumed.

However, it is more economical to have a single ballast in the lighting system rather than two ballasts. One implementation of a two level lighting system using only a single ballast requires two switches and two lamp sets. In an alternative implementation of a two level lighting system having a single ballast, the ballast includes two controllers, each of which controls a lamp set. In order to shut off one lamp set, the supply voltage to the controller corresponding to the one lamp set is pulled down (e.g., grounded) so that the controller is disabled. However, this implementation is not energy efficient, because even though a controller is disabled, the supply voltage for that controller is still being pulled from the power supply. Thus, it is desirable to have an energy efficient, cost effective, compact lighting system that is capable of providing multiple light levels.

Embodiments of the present invention provide a multiple level lighting system using a single ballast. The ballast is configured for connecting to a first lamp and a second lamp, and selectively energizing either the first lamp or the second lamp using lamp control switches, wherein a lamp control switch is connected in parallel with each lamp. In particular, the ballast includes a switching network that operates between a plurality of switching configurations. A control circuit is connected to the switching network via input terminals. The control circuit has a first output terminal connected to a first lamp control switch that is connected in parallel with the first lamp. Similarly, the control circuit has a second output terminal connected to a second lamp control switch that is connected in parallel with the second lamp. The first lamp control switch is connected to a power supply of the ballast. The second lamp control switch is connected to the first lamp control switch and first lamp and to ground potential.

The control circuit generates a first lamp control signal as a function of the switching network for selectively operating the first lamp control switch between a conductive state and a non-conductive state. Likewise, the control circuit generates a second lamp control signal as a function of the switching network for selectively operating the second lamp control switch between a conductive state and a non-conductive state. When the first control switch operates in the conductive state power from the power supply of the ballast is conducted by the first lamp control switch to the second lamp control switch and bypasses the first lamp, so the first lamp is not energized. When the first control switch operates in the non-conductive state power from the power supply of the ballast is provided to the first lamp energizing the first lamp and is conducted by the first lamp to the second lamp control switch. When the second control switch operates in the conductive state, the power conducted to the second control switch via one of the first lamp control switch and the first lamp is conducted by the second lamp control switch to the ground potential and bypasses the second lamp, so the second lamp is not energized. And, when the second control switch operates in the non-conductive state, power conducted to the second control switch via one of the first lamp control switch and the first lamp is provided to the second lamp energizing the second lamp.

In some embodiments, the first lamp and the second lamp are designed to provide different lighting levels when they are energized. For example, the first lamp may be designed to generate a first amount of lumens, and the second lamp may be designed to generate a second amount of lumens, wherein the first amount of lumens is greater than the second amount of lumens. Alternatively, the second amount of lumens may be greater than the first amount of lumens. Thus, embodiments of the present invention allow the first and the second lamps to be selectively and alternatively energized in order to provide three different lighting levels from a single ballast. The switching network allows a user to select whether the first lamp, the second lamp, or both lamps are energized, and accordingly, whether the lamp system emits a first lighting level, a second lighting level, or a third lighting level.

In an embodiment, there is provided a ballast to selectively operate a first lamp and a second lamp. The ballast includes: a switching network configured to selectively operate in a plurality of switching configurations; a control circuit having an input terminal connected to the switching network, the control circuit having a first output terminal configured to provide a first control signal as a function of the switching configuration of the switching network, the control circuit having a second output terminal configured to provide a second control signal as a function of the switching configuration of the switching network; a first lamp control switch adapted for connecting in parallel with the first lamp, the first lamp control switch connected to the first output terminal of the control circuit to receive the first control signal therefrom, the first lamp control switch connected to a ballast power supply, the first lamp control switch configured to operate between a conductive state and a non-conductive state as a function of the first control signal to selectively provide power to the first lamp; and a second lamp control switch adapted for connecting in parallel with the second lamp, the second lamp control switch connected to the second output terminal of the control circuit to receive the second control signal therefrom, the second lamp control switch connected to the first lamp control switch and to ground potential, the second lamp control switch configured to operate between a conductive state and a non-conductive state as a function of the second control signal to selectively provide power to the second lamp.

In a related embodiment, the first control switch may operate in the conductive state, power from the ballast power supply may be conducted by the first lamp control switch to the second lamp control switch and may bypass the first lamp, and when the first control switch operates in the non-conductive state, power from the ballast power supply may be provided to the first lamp, energizing the first lamp, and may be conducted by the first lamp to the second lamp control switch. In a further related embodiment, the second control switch may operate in the conductive state, the power conducted to the second control switch via one of the first lamp control switch and the first lamp may be conducted by the second lamp control switch to the ground potential and may bypass the second lamp, and when the second control switch operates in the non-conductive state, power conducted to the second control switch via one of the first lamp control switch and the first lamp may be provided to the second lamp, energizing the second lamp.

In another related embodiment, the plurality of switching configurations may include a first switching configuration, a second switching configuration, and a third switching configuration, the first lamp control switch may operate in the non-conductive state and the second lamp control switch may operate in the conductive state when the switching network is in the first switching configuration, the first lamp control switch may operate in the conductive state and the second lamp control switch may operate in the non-conductive state when the switching network is in the second switching configuration, and the first lamp control switch and the second lamp control switch may both operate in the non-conductive states when the switching network is in the third configuration.

In yet another related embodiment, the switching network may include a first switch to selectively connect the ballast to an alternating current (AC) power supply and a second switch to selectively connect the ballast to the AC power supply. In still another related embodiment, the ballast may include a first power input terminal adapted to connect to an alternating current (AC) power supply and receive AC power from the AC power supply; a second power input terminal adapted to connect to the AC power supply and receive AC power from the AC power supply; a neutral input terminal adapted to connect to the AC power supply; a rectifier to convert AC power received from the AC power supply to direct current (DC) power, wherein the switching network is connected between the first and second power input terminals and the rectifier; a power factor correction circuit connected to the rectifier to produce a DC voltage output; and an inverter to convert the DC voltage output to AC voltage for providing to the first lamp and the second lamp, wherein the first lamp control switch is connected to the ballast power supply via the inverter.

In yet another related embodiment, the first lamp control switch may be connected in parallel with the first lamp and the second lamp control switch may be connected in parallel with the second lamp, and wherein the first lamp and the second lamp may be connected together in series. In a further related embodiment, the first lamp may be designed to provide a first lamp output and the second lamp may be designed to provide a second lamp output, wherein the first lamp output may be different from the second lamp output.

In another embodiment, there is provided a ballast to selectively operate a first lamp and a second lamp. The ballast includes: a first power input terminal adapted to connect to an alternating current (AC) power supply and receive AC power from the AC power supply; a second power input terminal adapted to connect to the AC power supply and receive AC power from the AC power supply; a neutral input terminal adapted to connect to the AC power supply; a rectifier to convert AC power received from the AC power supply to direct current (DC) power; a power factor correction circuit connected to the rectifier to produce a DC voltage output; an inverter to convert the DC voltage output to AC voltage for providing to the first lamp and the second lamp; a first input switch connected between the first power input terminal and the rectifier, the first input switch having a conductive state and a non-conductive state; a second input switch connected between the second power input terminal and the rectifier, the second input switch having a conductive state and a non-conductive state; a control circuit having a first input terminal and a second input terminal, the first input terminal connected to the first input switch to selectively receive AC power from the AC power supply as a function of the state of the first switch, the second input terminal connected to the second input switch to selectively receive AC voltage from the AC power supply as a function of the state of the second switch, the control circuit having a first output terminal and a second output terminal, the control circuit configured to provide via the first output terminal a first control signal as a function of receiving AC power from the AC power supply via the first input terminal of the control circuit, the control circuit configured to provide via the second output terminal a second control signal as a function of receiving AC power from the AC power supply via the second input terminal of the control circuit; a first lamp control switch connected to the first output terminal of the control circuit, the first lamp control switch configured for connecting in parallel with the first lamp to selectively provide, as a function of the first control signal, AC voltage from the inverter to the first lamp to energize the first lamp; and a second lamp control switch connected to the second output terminal of the control circuit, the second lamp control switch configured for connecting in parallel with the second lamp to selectively provide, as a function of the second control signal, AC voltage from the inverter to the second lamp to energize the second lamp.

In a related embodiment, the second lamp control switch may be connected to the first lamp control switch and configured for connecting to the first lamp such that the second lamp control switch receives AC voltage from the inverter via one of the first lamp control switch and the first lamp. In another related embodiment, the first input switch may operate in the conductive state, the first lamp control switch may provide AC voltage from the inverter to the first lamp to energize the first lamp, and when the first input switch operates in the non-conductive state, the first lamp control switch may inhibit AC voltage from the inverter from being provided to the first lamp, and thereby inhibit the first lamp from being energized.

In still another related embodiment, the second input switch may operate in the conductive state, the second lamp control switch may provide AC voltage from the inverter to the second lamp to energize the second lamp, and when the second input switch operates in the non-conductive state, the second lamp control switch may inhibit AC voltage from the inverter from being provided to the first lamp, and thereby inhibit the first lamp from being energized.

In yet another related embodiment, the first lamp control switch may be connected in parallel with the first lamp, and the second lamp control switch may be connected in parallel with the second lamp, and the first lamp and the second lamp may be connected together in series. In a further related embodiment, the first lamp may be designed to provide a first lamp output and the second lamp may be designed to provide a second lamp output, wherein the first lamp output may be different from the second lamp output.

In another embodiment, there is provided a ballast to selectively operate a first lamp and a second lamp. The ballast includes: a switching network configured to selectively operate in a plurality of switching configurations; a control circuit having an input terminal connected to the switching network, the control circuit having a first output terminal configured to provide a first control signal as a function of the switching configuration of the switching network, the control circuit having a second output terminal configured to provide a second control signal as a function of the switching configuration of the switching network; a first lamp control switch adapted for connecting in parallel with the first lamp, the first lamp control switch connected to the first output terminal of the control circuit to receive the first control signal therefrom, the first lamp control switch connected to a ballast power supply, the first lamp control switch configured to operate between a conductive state and a non-conductive state as a function of the first control signal to selectively provide power to the first lamp; and a second lamp control switch adapted for connecting in parallel with the second lamp, the second lamp control switch connected to the second output terminal of the control circuit to receive the second control signal therefrom, the second lamp control switch connected to the first lamp control switch and to ground potential, the second lamp control switch configured to operate between a conductive state and a non-conductive state as a function of the second control signal to selectively provide power to the second lamp; wherein when the first control switch operates in the conductive state, power from the ballast power supply is conducted by the first lamp control switch to the second lamp control switch and bypasses the first lamp, and wherein when the first control switch operates in the non-conductive state, power from the ballast power supply is provided to the first lamp, energizing the first lamp, and is conducted by the first lamp to the second lamp control switch; wherein when the second control switch operates in the conductive state, the power conducted to the second control switch via one of the first lamp control switch and the first lamp is conducted by the second lamp control switch to the ground potential and bypasses the second lamp, and wherein when the second control switch operates in the non-conductive state, power conducted to the second control switch via one of the first lamp control switch and the first lamp is provided to the second lamp, energizing the second lamp.

In a related embodiment, the plurality of switching configurations may include a first switching configuration, a second switching configuration, and a third switching configuration, wherein the first lamp control switch may operate in the non-conductive state and the second lamp control switch may operate in the conductive state when the switching network is in the first switching configuration, wherein the first lamp control switch may operate in the conductive state and the second lamp control switch may operate in the non-conductive state when the switching network is in the second switching configuration, and wherein the first lamp control switch and the second lamp control switch may both operate in the non-conductive states when the switching network is in the third configuration. In a further related embodiment, the switching network may include a first switch to selectively connect the ballast to an alternating current (AC) power supply and a second switch to selectively connect the ballast to the AC power supply.

In another related embodiment, the ballast further includes: a first power input terminal adapted to connect to an alternating current (AC) power supply and receive AC power from the AC power supply; a second power input terminal adapted to connect to the AC power supply and receive AC power from the AC power supply; a neutral input terminal adapted to connect to the AC power supply; a rectifier to convert AC power received from the AC power supply to direct current (DC) power, wherein the switching network is connected between the first and second power input terminals and the rectifier; a power factor correction circuit connected to the rectifier to produce a DC voltage output; and an inverter to convert the DC voltage output to AC voltage for providing to the lamps, wherein the first lamp control switch is connected to the ballast power supply via the inverter.

In yet another related embodiment, the first lamp control switch may be connected in parallel with the first lamp and the second lamp control switch may be connected in parallel with the second lamp, and the first lamp and the second lamp may be connected together in series. In a further related embodiment, the first lamp may be designed to provide a first lamp output and the second lamp may be designed to provide a second lamp output, wherein the first lamp output may be different from the second lamp output.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
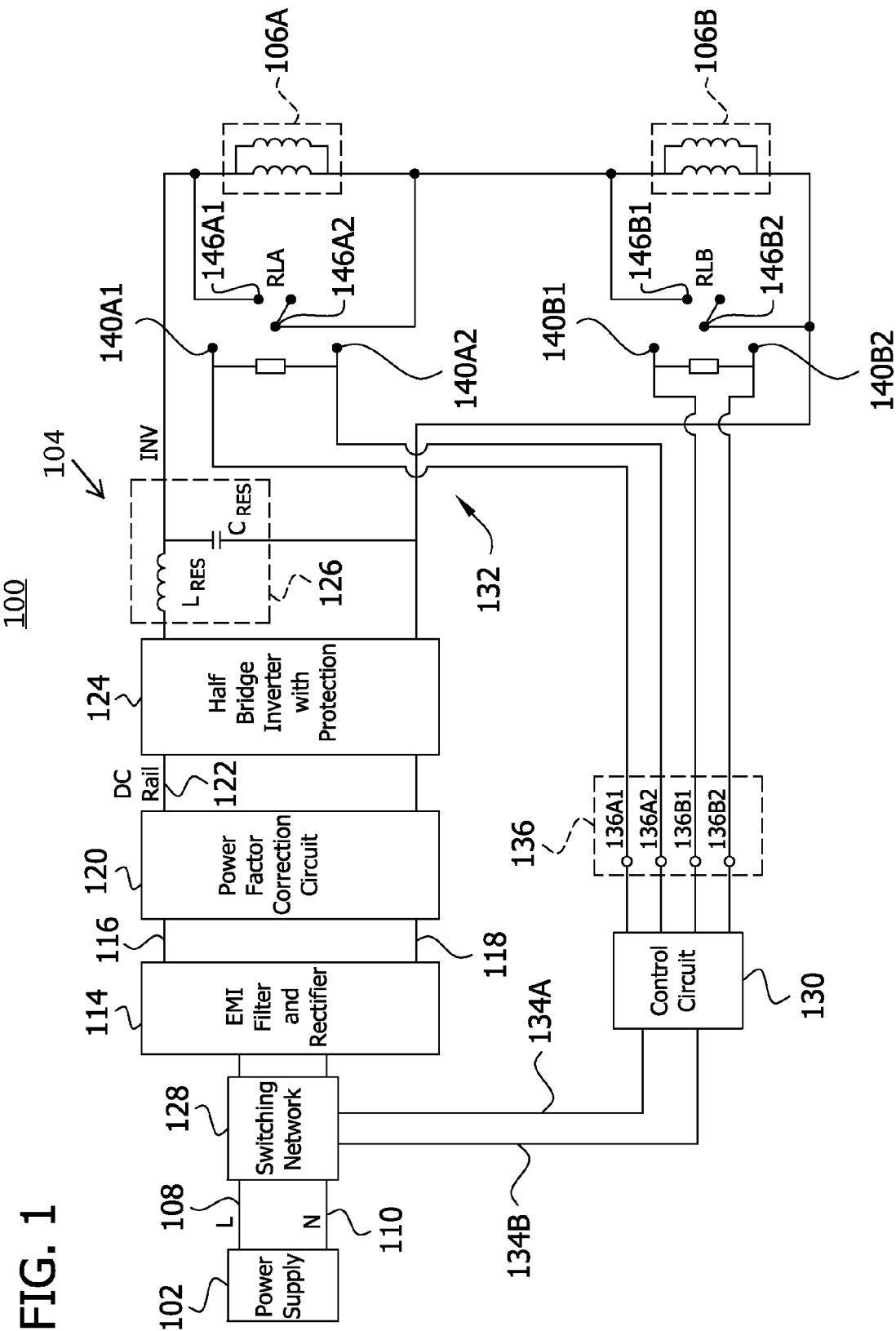
FIGS. 1 and 2 each show a schematic diagram, partially in block form, of a lamp system according to embodiments disclosed herein.

FIG. 1 illustrates a lamp system 100, according to embodiments disclosed herein. The lamp system 100 includes an input power source, such as an alternating current (AC) power supply 102, an electronic ballast 104 (hereinafter ballast 104), and a plurality of lamps 106. In particular, FIG. 1 shows a first lamp 106A and a second lamp 106B connected together in series. However, additional lamps may be used without departing from the scope of the invention. In some embodiments, the first lamp 106A and the second lamp 106B are electrodeless lamps, such as but not limited to ICETRON® lamps available from OSRAM SYLVANIA. However, it is possible to use other types of lamps, both electrodeless and not, without departing from the scope of the invention as described herein.

The ballast 104 includes at least one high voltage input terminal (i.e., line voltage input terminal) 108 adapted for connecting to an alternating current (AC) power supply (e.g., standard 120V AC household power, such as the AC power supply 102), a neutral input terminal 110, and a ground terminal connectable to ground potential (not illustrated). An input AC power signal is received by the ballast 104 from the AC power supply 102 via the high voltage input terminal 108. The ballast 104 includes an electromagnetic interference (EMI) filter and a rectifier (e.g., full-wave rectifier) 114, which are illustrated together in FIG. 1. The EMI filter portion of the EMI filter and rectifier 114 prevents noise that may be generated by the ballast 104 from being transmitted back to the AC power supply 102. The rectifier portion of the EMI filter and rectifier 114 converts AC voltage received from the AC power supply 102 to DC (direct current) voltage. The rectifier portion includes a first output terminal connected to a DC bus 116 and a second output terminal connected to a ground potential at ground connection point 118. Thus, the EMI filter and rectifier 114 outputs a DC voltage on the DC bus 116.

A power factor correction circuit 120, which may, in some embodiments, be a boost converter, is connected to the first and second output terminals of the EMI filter and rectifier 114. The power factor correction circuit 120 receives the rectified DC voltage and produces a high DC voltage on a high DC voltage bus ("high DC bus") 122. For example, the power factor correction circuit 120 may provide a voltage of around 450 volts to the high DC voltage bus 122. An inverter circuit 124, such as a half bridge inverter, having an inverter input is connected to the power factor correction circuit 120 for receiving the high DC voltage and converting it to AC voltage. The inverter circuit 124 has a first output terminal for providing the AC voltage and a second output terminal connected to ground potential.

In some embodiments, the inverter circuit 124 includes a protection circuit. The protection circuit senses the AC voltage signal being provided to the lamps 106A, 106B and shuts down the inverter circuit 124 if the AC voltage exceeds a predefined threshold value. For example, the protection circuit is able to shut down the inverter circuit 124 when there is no lamp 106A, 106B connected to the ballast 104 because the lamp 106A, 106B is not present or because wires used to connect the lamp 106A, 106B to the ballast 104 have become disconnected during normal operation. In FIG. 1, the inverter output is connected to a resonant circuit 126. The resonant circuit 126 comprises an inductor $L_{RES}$ and a capacitor $C_{RES}$ connected together in series. The resonant circuit 126 provides a high voltage for igniting the lamps 106A and 106B, and also provides a magnitude-limited current for operating the lamps 106A and 106B at a particular current. The resonant circuit 126 provides this power to the lamps 106A and 106B via a first output terminal (e.g., high voltage AC output terminal) and a second output terminal (e.g., ground potential terminal).

The ballast 104 also includes an input switching network 128, a control circuit 130, and lamp control switches 132 in order to selectively operate each of the lamps 106A and 106B. The lamp control switches 132 are connected together in series, with each lamp control switch being connected in parallel across a lamp 106. In some embodiments, each lamp control switch is a relay, such as the JQC-3FF relay available from HONGFA RELAY. As illustrated in FIG. 1, the plurality (e.g., set, group) of lamp control switches 132 is connected between the first output terminal (e.g., high voltage AC output terminal) and the second output terminal (e.g., ground terminal) of the resonant circuit 126. The input switching network 128 is connected between the ballast input terminals (e.g., high voltage input terminal 108, neutral terminal 110) and the EMI filter and rectifier 110. As further described below, the input switching network 128 comprises at least one switch and is configured to selectively operate in a plurality of switching configurations.

The control circuit 130 has an input terminal(s) (e.g., input terminal 134A, input terminal 134B) connected to the input switching network 128 for selectively receiving power from the power supply 102 based on the switching configuration of the input switching network 128. The control circuit 130 has a plurality of output terminals 136, each dedicated to a particular lamp control switch (e.g., lamp control switch RLA, lamp control switch RLB). The control circuit 130 generates a separate control signal for each of the lamp control switches. The control signal generated by the control circuit 130 is based on the switching configuration of the input switching network 128. Each lamp control switch operates between a first state (e.g., closed/conductive/ON) and a second state (e.g., open/non-conductive/OFF) as a function of the control signal received thereby. In some embodiments, when the lamp control switch operates in the first state, the lamp control switch conducts power, and thus power output from the resonant circuit 126 is conducted by the lamp control switch and bypasses the lamp 106 that is connected in parallel with the lamp control switch. On the other hand, when the lamp control switch operates in the second state, the lamp control switch does not conduct power, and thus power output from the resonant circuit 126 is provided to the lamp 106 that is connected in parallel with the lamp control switch. As such, the lamp 106 connected in parallel with the lamp control switch is not energized when the lamp control switch operates in the first state (e.g., closed/conductive/ON), and is energized when the lamp control switch operates in the second state (e.g., open/non-conductive/OFF). As such, embodiments of the present invention provide a ballast 104 with a switching network 128 that has a plurality of switching configurations, each configuration controlling whether one of the series-connected plurality of lamps 106 is illuminated. Accordingly, the plurality of switching configurations provided by the ballast 104 allows the lamps 106 connected thereto to be illuminated in a plurality of combinations so that the ballast 104 provides a plurality of lamp lighting levels.

In the lamp system 100, the switching network 128 and the control circuit 130 are used to control a first lamp 106A and a second lamp 106B via a first lamp control switch RLA and a second lamp control switch RLB, respectively, in order to generate three lamp lighting levels. In particular, the control circuit 130 includes first output terminals, 136A1 and 136A2, which are connected to input terminals 140A1 and 140A2 of the first lamp control switch RLA. In some embodiments, the first output terminals 136A1 and 136A2 comprise a DC voltage terminal $V_{DC}$ 136A1 and a ground output terminal 136A2. Similarly, the control circuit 130 includes second output terminals, 136B1 and 136B2, which are connected to input terminals 140B1 and 140B2 of the second lamp control switch RLB. In some embodiments, the second output terminals 136B1 and 136B2 comprise a DC voltage terminal $V_{DC}$ 136B1 and a ground output terminal 136B2. The first lamp control switch RLA is configured for connecting in parallel across the first lamp 106A. In FIG. 1, the first lamp control switch RLA has first and second output terminals, 146A1 and 146A2, and the first lamp 106A is connected between the first and second output terminals, 146A1 and 146A2. The second lamp control switch RLB is configured for connecting in parallel across the second lamp 106B. In FIG. 1, the second lamp control switch RLB has first and second output terminals, 146B1 and 146B2, and the second lamp 106B is connected between the first and second output terminals, 146B1 and 146B2. The first lamp control switch RLA is connected in series with the second lamp control switch RLB. In particular, the first output terminal 146A1 of the first lamp control switch RLA is connected to the AC output terminal of the resonant circuit 126. The second output terminal 146A2 of the first lamp control switch RLA is connected with the first output terminal 146B1 of the second lamp control switch RLB. The second output terminal 146B2 of the second lamp control switch RLB is connected to the ground terminal of the resonant circuit 126.

The control circuit 130 generates a first control signal as a function of the switching configuration of the switching network 128 for controlling the first lamp control switch RLA, and provides the first control signal to the first lamp control switch RLA via the first output terminals, 136A1 and 136A2. Likewise, the control circuit 130 generates a second control signal as a function of the switching configuration of the switching network 128 for controlling the second lamp control switch RLB, and provides the second control signal to the second lamp control switch RLB via the second output terminals, 136B1 and 136B2. In some embodiments, the control circuit 130 is configured to generate a control signal (i.e., first control signal, second control signal) having a first value (e.g., 0 Volts) to operate the corresponding lamp control switch (i.e., first lamp control switch RLA, second lamp control switch RLB) in the first state (e.g., closed/conductive/ON). The control circuit 130 is configured to generate a control signal (i.e., first control signal, second control signal) having a second value (e.g., 10 Volts) to operate the corresponding lamp control switch (i.e., first lamp control switch RLA, second lamp control switch RLB) in the second state (e.g., open/non-conductive/OFF).

Accordingly, when the first control signal has the second value (e.g., 10 Volts), and the second control signal has the first value (e.g., 0 Volts), the first lamp control switch RLA will operate in the second state (e.g., open/non-conductive/OFF) and the second lamp control switch RLB will operate in the first state (e.g., closed/conductive/ON). Thus, current will be conducted in a path from the AC voltage output terminal of the resonant circuit 126 through the first lamp 106A and through the second lamp control switch RLB to the ground terminal of the resonant circuit 126. As such, the first lamp 106A will be illuminated, but the second lamp 106B will not be illuminated, since the second lamp control switch RLB conducts the current, bypassing it from the second lamp 106B. When the first control signal has the first value (e.g., 0 Volts), and the second control signal has the second value (e.g., 10 Volts), the first lamp control switch RLA will operate in the first state (e.g., closed/conductive/ON) and the second lamp control switch RLB will operate in the second state (e.g., open/non-conductive/OFF). Thus, current will be conducted in a path from the AC voltage output terminal of the resonant circuit 126 through the first lamp control switch RLA and through the second lamp 106B to the ground terminal of the resonant circuit 126. As such, the second lamp 106B will be illuminated, but the first lamp 106A will not be illuminated, since the first lamp control switch RLA conducts the current, bypassing it from the first lamp 106A. When the first control signal has the second value (e.g., 10 Volts), and the second control signal has the second value (e.g., 10 Volts), both the first lamp control switch RLA and the second lamp control switch RLB will operate in the second state (e.g., open/non-conductive/OFF). Thus, current will be conducted in a path from the AC voltage output terminal of the resonant circuit 126 through the first lamp 106A and through the second lamp 106B to the ground terminal of the resonant circuit 126. As such, both the first lamp 106A and the second lamp 106B will be illuminated.

In some embodiments, the first lamp 106A and the second lamp 106B are designed to generate different lighting outputs. As such, the lamp system 100 provides a first lamp lighting level when the first lamp 106A is illuminated and the second lamp 106B is not illuminated. The lamp system 100 provides a second lamp lighting level when the first lamp 106A is not illuminated and the second lamp 106B is illuminated. The lamp system 100 provides a third lighting level when the first lamp 106A and the second lamp 106B are both illuminated.

Figure 2:
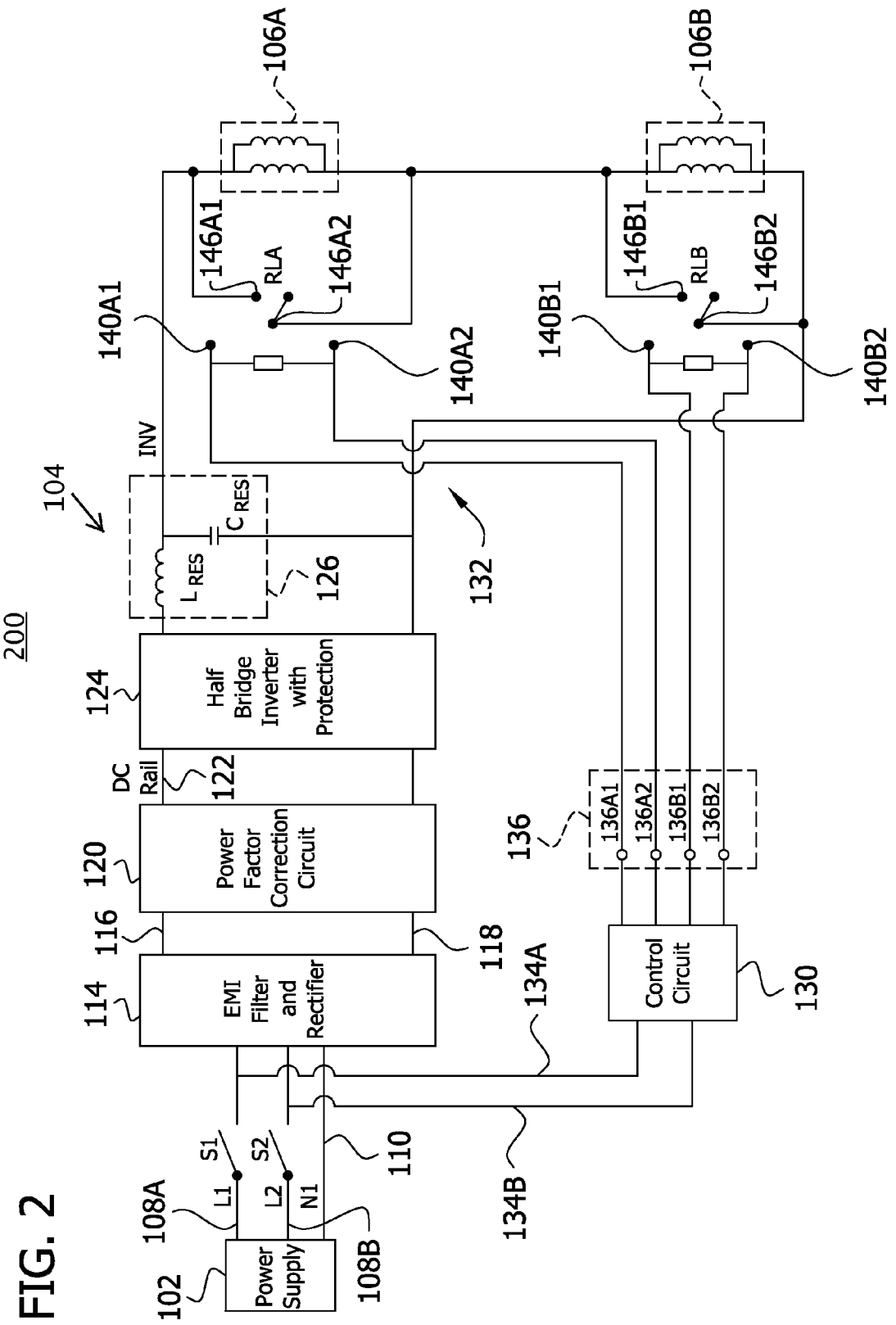

FIG. 2 illustrates a lamp system 200 having an exemplary switching network 128 that may be used in accordance with embodiments to provide three lamp lighting levels. In FIG. 2, the ballast 104 includes a first high voltage input terminal 108A for connecting the ballast 104 to a first power supply line L1, and a second high voltage input terminal 108B for connecting the ballast 104 to a second power supply line L2. The switching network 128 includes a first input switch S1 for selectively connecting the first power supply line L1 to the ballast 104 via the first high voltage input terminal 108A, and a second input switch S2 for selectively connecting the second power line L2 to the ballast 104 via the second high voltage input terminal 108B. In particular, the first input switch S1 is connected between the first high voltage input terminal 108A and the EMI filter and rectifier 114 for selectively connecting the first power supply line L1 to the EMI filter and rectifier 114. The second input switch S2 is connected between the second high voltage input terminal 108B and the EMI filter and rectifier 114 for selectively connecting the second power supply line L2 to the EMI filter and rectifier 114.

Each of the first and second input switches, S1 and S2, has a conductive state and a non-conductive state. When the first input switch S1 operates in the conductive state, the first input switch S1 conducts power from the AC power supply 102 to the ballast 104. In particular, during the conductive state, the first input switch S1 conducts power from the AC power supply 102 via the first power supply line L1 to the EMI filter and rectifier 114. When the first input switch S1 operates in the non-conductive state, the first input switch S1 does not conduct power from the AC power supply 102 via the first supply line L1 to the EMI filter and rectifier 114 (e.g., the first input switch S1 inhibits power conduction from the AC power supply 102 to the rectifier via the first input switch S1). When the second input switch S2 operates in the conductive state, the second input switch S2 conducts power from the AC power supply 102 to the ballast 104. In particular, during the conductive state, the second input switch S2 conducts power from the AC power supply 102 via the second power supply line L2 to the EMI filter and rectifier 114. When the second input switch S2 operates in the non-conductive state, the second input switch S2 does not conduct power from the AC power supply 102 via the second supply line L2 to the EMI filter and rectifier 114 (e.g., the second input switch S2 inhibits power conduction from the AC power supply 102 to the rectifier via the second input switch S2).

In the lamp system 200, the control circuit 130 has a first input terminal 134A and a second input terminal 134B. The first input terminal 134A is connected to the first power supply line L1 between the first input switch S1 and the EMI filter and rectifier 114. The second input terminal 134B is connected to the second power supply line L2 between the second input switch S2 and the EMI filter and rectifier 114. In some embodiments, the control circuit 130 receives a first input signal having a first value (e.g., low voltage value; 0 Volts) from the AC power supply 102 via the first input switch S1 and the first input terminal 134A when the first input switch S1 is operating in the non-conductive state (e.g., S1 is open/OFF). On the other hand, the control circuit 130 receives a first input signal having a second value (e.g., high voltage value) from the AC power supply 102 via the first input switch S1 and the first input terminal 134A when the first input switch S1 is operating in the conductive state (e.g., S1 is closed/ON). Similarly, the control circuit 130 receives a second input signal having a first value (e.g., low voltage value; 0 Volts) from the AC power supply 102 via the second input switch S2 and the second input terminal 134B when the first second switch S2 is operating in the non-conductive state (e.g., S2 is open/OFF). On the other hand, the control circuit 130 receives a second input signal having a second value (e.g., high voltage value) from the AC power supply 102 via the second input switch S2 and the second input terminal 134B when the second input switch S2 is operating in the conductive state (e.g., S2 is closed/ON).

In response to receiving the first input signal having the first value (e.g., 0 Volts) from the AC power supply 102, the control circuit 130 generates the first control signal having the first value (e.g., 0 Volts) across the first output terminals 136A1 and 136A2. As discussed above in connection with the lamp system 100 of FIG. 1, the first lamp control switch RLA accordingly operates in a conductive state such that current from the AC voltage output terminal of the resonant circuit 126 bypasses the first lamp 106A. In response to receiving the first input signal having the second value (e.g., 10 Volts), the control circuit 130 generates the first control signal having the second value (e.g., 10 Volts) across the first output terminals 136A1 and 136A2. The first lamp control switch RLA accordingly operates in a non-conductive state such that current from the AC voltage output terminal of the resonant circuit 126 is provided to the first lamp 106A. Similarly, in response to receiving the second input signal having the first value (e.g., 0 Volts), the control circuit 130 generates the second control signal having the first value (e.g., 0 Volts) across the second output terminals 136B1 and 136B2. As discussed above in connection with the lamp system 100, the second lamp control switch RLB accordingly operates in a conductive state such that current from the AC voltage output terminal of the resonant circuit 126 passing through the first lamp 106A or first lamp control switch RLA bypasses the second lamp 106B. In response to receiving the second input signal having the second value (e.g., 10 Volts), the control circuit 130 generates the second control signal having the second value (e.g., 10 Volts) across the second output terminals 136B1 and 136B2. The second lamp control switch RLB accordingly operates in a non-conductive state such that current from the AC voltage output terminal of the resonant circuit 126 passing through the first lamp 106A or first lamp control switch RLA is provided to the second lamp 106B.

In other words, when the first switch S1 is non-conductive (e.g., open/OFF), the first lamp 106A is not energized. When the first switch S1 is conductive (e.g., closed/ON), the first lamp 106A is energized. When the second switch S2 is non-conductive (e.g., open/OFF), the second lamp 106B is not energized. When the second switch S2 is conductive (e.g., closed/ON), the second lamp 106B is energized.

As discussed above in connection with lamp system 100, the first lamp 106A and the second lamp 106B may be designed to generate different lighting outputs. As such, the lamp system 200 provides a first lamp lighting level when the first lamp 106A is illuminated and the second lamp 106B is not illuminated. The lamp system 200 provides a second lamp lighting level when the first lamp 106A is not illuminated and the second lamp 106B is illuminated. The lamp system 200 provides a third lighting level when the first lamp 106A and the second lamp 106B are both illuminated. For example, in some embodiments, the ballast 104 is a 100 Watt ballast, the first lamp 106A is a 70 Watt lamp, and the second lamp 106B is a 40 Watt lamp. According to this example, the lamp system 200 would provide a first lighting level of 70 Watts, a second lamp lighting level of 40 Watts, and a third lamp lighting level of 110 Watts. According to another example, the ballast 104 is a 150 Watt ballast, the first lamp 106A is a 100 Watt lamp, and the second lamp 106B is a 40 Watt lamp. Here, the lamp system 200 would provide a first lighting level of 100 Watts, a second lamp lighting level of 40 Watts, and a third lamp lighting level of 140 Watts. In yet another example, the ballast 104 is a 200 Watt ballast, the first lamp 106A is a 150 Watt lamp, and the second lamp 106B is a 40 Watt lamp. Accordingly, the lamp system 200 would provide a first lighting level of 150 Watts, a second lamp lighting level of 40 Watts, and a third lamp lighting level of 190 Watts.

While embodiments of the invention have been discussed in the context of a lamp system having three lamp lighting levels, it should be noted that principles discussed herein could be applied to three or more series connected lamps in order to provide additional lamp lighting levels.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A ballast to selectively operate a first lamp and a second lamp, comprising:
   a switching network configured to selectively operate in a plurality of switching configurations;
   a control circuit having an input terminal connected to the switching network, the control circuit having a first output terminal configured to provide a first control signal as a function of the switching configuration of the switching network, the control circuit having a second output terminal configured to provide a second control signal as a function of the switching configuration of the switching network;
   a first lamp control switch adapted for connecting in parallel with the first lamp, the first lamp control switch connected to the first output terminal of the control circuit to receive the first control signal therefrom, the first lamp control switch connected to a ballast power supply, the first lamp control switch configured to operate between a conductive state and a non-conductive state as a function of the first control signal to selectively provide power to the first lamp; and
   a second lamp control switch adapted for connecting in parallel with the second lamp, the second lamp control switch connected to the second output terminal of the control circuit to receive the second control signal therefrom, the second lamp control switch connected to the first lamp control switch and to ground potential, the second lamp control switch configured to operate between a conductive state and a non-conductive state as a function of the second control signal to selectively provide power to the second lamp.

2. The ballast of claim 1, wherein when the first lamp control switch operates in the conductive state, power from the ballast power supply is conducted by the first lamp control switch to the second lamp control switch and bypasses the first lamp, and wherein when the first lamp control switch operates in the non-conductive state, power from the ballast power supply is provided to the first lamp, energizing the first lamp, and is conducted by the first lamp to the second lamp control switch.

3. The ballast of claim 2, wherein when the second lamp control switch operates in the conductive state, the power conducted to the second lamp control switch via one of the first lamp control switch and the first lamp is conducted by the second lamp control switch to the ground potential and bypasses the second lamp, and wherein when the second lamp control switch operates in the non-conductive state, power conducted to the second lamp control switch via one of the first lamp control switch and the first lamp is provided to the second lamp, energizing the second lamp.

4. The ballast of claim 1, wherein the plurality of switching configurations comprises a first switching configuration, a second switching configuration, and a third switching configuration, wherein the first lamp control switch operates in the non-conductive state and the second lamp control switch operates in the conductive state when the switching network is in the first switching configuration, wherein the first lamp control switch operates in the conductive state and the second lamp control switch operates in the non-conductive state when the switching network is in the second switching configuration, and wherein the first lamp control switch and the second lamp control switch both operate in the non-conductive states when the switching network is in the third configuration.

5. The ballast of claim 1, wherein the switching network includes a first switch to selectively connect the ballast to an alternating current (AC) power supply and a second switch to selectively connect the ballast to the AC power supply.

6. The ballast of claim 1, further comprising:
a first power input terminal adapted to connect to an alternating current (AC) power supply and receive AC power from the AC power supply;
a second power input terminal adapted to connect to the AC power supply and receive AC power from the AC power supply;
a neutral input terminal adapted to connect to the AC power supply;
a rectifier to convert AC power received from the AC power supply to direct current (DC) power, wherein the switching network is connected between the first and second power input terminals and the rectifier;
a power factor correction circuit connected to the rectifier to produce a DC voltage output;
an inverter to convert the DC voltage output to AC voltage for providing to the first lamp and the second lamp, wherein the first lamp control switch is connected to the ballast power supply via the inverter.

7. The ballast of claim 1, wherein the first lamp control switch is connected in parallel with the first lamp and the second lamp control switch is connected in parallel with the second lamp, and wherein the first lamp and the second lamp are connected together in series.

8. The ballast of claim 7, wherein the first lamp is designed to provide a first lamp output and the second lamp is designed to provide a second lamp output, wherein the first lamp output is different from the second lamp output.

9. A ballast to selectively operate a first lamp and a second lamp, the ballast comprising:

a first power input terminal adapted to connect to an alternating current (AC) power supply and receive AC power from the AC power supply;
a second power input terminal adapted to connect to the AC power supply and receive AC power from the AC power supply;
a neutral input terminal adapted to connect to the AC power supply;
a rectifier to convert AC power received from the AC power supply to direct current (DC) power;
a power factor correction circuit connected to the rectifier to produce a DC voltage output;
an inverter to convert the DC voltage output to AC voltage for providing to the first lamp and the second lamp;
a first input switch connected between the first power input terminal and the rectifier, the first input switch having a conductive state and a non-conductive state;
a second input switch connected between the second power input terminal and the rectifier, the second input switch having a conductive state and a non-conductive state;
a control circuit having a first input terminal and a second input terminal, the first input terminal connected to the first input switch to selectively receive AC power from the AC power supply as a function of the state of the first switch, the second input terminal connected to the second input switch to selectively receive AC voltage from the AC power supply as a function of the state of the second switch, the control circuit having a first output terminal and a second output terminal, the control circuit configured to provide via the first output terminal a first control signal as a function of receiving AC power from the AC power supply via the first input terminal of the control circuit, the control circuit configured to provide via the second output terminal a second control signal as a function of receiving AC power from the AC power supply via the second input terminal of the control circuit;
a first lamp control switch connected to the first output terminal of the control circuit, the first lamp control switch configured for connecting in parallel with the first lamp to selectively provide, as a function of the first control signal, AC voltage from the inverter to the first lamp to energize the first lamp; and
a second lamp control switch connected to the second output terminal of the control circuit, the second lamp control switch configured for connecting in parallel with the second lamp to selectively provide, as a function of the second control signal, AC voltage from the inverter to the second lamp to energize the second lamp.

10. The ballast of claim 9, wherein the second lamp control switch is connected to the first lamp control switch and configured for connecting to the first lamp such that the second lamp control switch receives AC voltage from the inverter via one of the first lamp control switch and the first lamp.

11. The ballast of claim 9, wherein when the first input switch operates in the conductive state, the first lamp control switch provides AC voltage from the inverter to the first lamp to energize the first lamp, and when the first input switch operates in the non-conductive state, the first lamp control switch inhibits AC voltage from the inverter from being provided to the first lamp, and thereby inhibits the first lamp from being energized.

12. The ballast of claim 9, wherein when the second input switch operates in the conductive state, the second lamp control switch provides AC voltage from the inverter to the second lamp to energize the second lamp, and when the second input switch operates in the non-conductive state, the second lamp control switch inhibits AC voltage from the inverter from being provided to the first lamp, and thereby inhibits the first lamp from being energized.

13. The ballast of claim 9, wherein the first lamp control switch is connected in parallel with the first lamp, and the second lamp control switch is connected in parallel with the second lamp, and wherein the first lamp and the second lamp are connected together in series.

14. The ballast of claim 13, wherein the first lamp is designed to provide a first lamp output and the second lamp is designed to provide a second lamp output, wherein the first lamp output is different from the second lamp output.

15. A ballast to selectively operate a first lamp and a second lamp, the ballast comprising:
a switching network configured to selectively operate in a plurality of switching configurations;
a control circuit having an input terminal connected to the switching network, the control circuit having a first output terminal configured to provide a first control signal as a function of the switching configuration of the switching network, the control circuit having a second output terminal configured to provide a second control signal as a function of the switching configuration of the switching network;
a first lamp control switch adapted for connecting in parallel with the first lamp, the first lamp control switch connected to the first output terminal of the control circuit to receive the first control signal therefrom, the first lamp control switch connected to a ballast power supply, the first lamp control switch configured to operate between a conductive state and a non-conductive state as a function of the first control signal to selectively provide power to the first lamp; and
a second lamp control switch adapted for connecting in parallel with the second lamp, the second lamp control switch connected to the second output terminal of the control circuit to receive the second control signal therefrom, the second lamp control switch connected to the first lamp control switch and to ground potential, the second lamp control switch configured to operate between a conductive state and a non-conductive state as a function of the second control signal to selectively provide power to the second lamp;
wherein when the first lamp control switch operates in the conductive state, power from the ballast power supply is conducted by the first lamp control switch to the second lamp control switch and bypasses the first lamp, and wherein when the first lamp control switch operates in the non-conductive state, power from the ballast power supply is provided to the first lamp, energizing the first lamp, and is conducted by the first lamp to the second lamp control switch;
wherein when the second lamp control switch operates in the conductive state, the power conducted to the second lamp control switch via one of the first lamp control switch and the first lamp is conducted by the second lamp control switch to the ground potential and bypasses the second lamp, and wherein when the second lamp control switch operates in the non-conductive state, power conducted to the second control switch via one of the first lamp control switch and the first lamp is provided to the second lamp, energizing the second lamp.

16. The ballast of claim 15, wherein the plurality of switching configurations comprises a first switching configuration, a second switching configuration, and a third switching configuration, wherein the first lamp control switch operates in the non-conductive state and the second lamp control switch operates in the conductive state when the switching network is in the first switching configuration, wherein the first lamp control switch operates in the conductive state and the second lamp control switch operates in the non-conductive state when the switching network is in the second switching configuration, and wherein the first lamp control switch and the second lamp control switch both operate in the non-conductive states when the switching network is in the third configuration.

17. The ballast of claim 16, wherein the switching network includes a first switch to selectively connect the ballast to an alternating current (AC) power supply and a second switch to selectively connect the ballast to the AC power supply.

18. The ballast of claim 15 further comprising:
a first power input terminal adapted to connect to an alternating current (AC) power supply and receive AC power from the AC power supply;
a second power input terminal adapted to connect to the AC power supply and receive AC power from the AC power supply;
a neutral input terminal adapted to connect to the AC power supply;
a rectifier to convert AC power received from the AC power supply to direct current (DC) power, wherein the switching network is connected between the first and second power input terminals and the rectifier;
a power factor correction circuit connected to the rectifier to produce a DC voltage output; and
an inverter to convert the DC voltage output to AC voltage for providing to the lamps, wherein the first lamp control switch is connected to the ballast power supply via the inverter.

19. The ballast of claim 15, wherein the first lamp control switch is connected in parallel with the first lamp and the second lamp control switch is connected in parallel with the second lamp, and wherein the first lamp and the second lamp are connected together in series.

20. The ballast of claim 19, wherein the first lamp is designed to provide a first lamp output and the second lamp is designed to provide a second lamp output, wherein the first lamp output is different from the second lamp output.

* * * * *